United States Patent [19]

Griepentrog

[11] Patent Number: 5,569,985

[45] Date of Patent: Oct. 29, 1996

[54] AMPLIFIER FOR SCANNING BEAM VELOCITY MODULATION

[75] Inventor: Dal F. Griepentrog, Indianapolis, Ind.

[73] Assignee: Thomson Consumer Electronics, Inc., Indianapolis, Ind.

[21] Appl. No.: 285,566

[22] Filed: Aug. 3, 1994

[51] Int. Cl.$^6$ .............................. G09G 1/04; H04N 5/21
[52] U.S. Cl. ........................ 315/397; 315/403; 348/626
[58] Field of Search ................................ 315/397, 403, 315/407, 370; 348/626

[56] References Cited

U.S. PATENT DOCUMENTS

| 4,185,301 | 1/1980 | Mitsuda et al. | 358/242 |
|---|---|---|---|
| 5,093,728 | 3/1992 | Altmanshofer | 348/626 |

FOREIGN PATENT DOCUMENTS

| 0469566A2 | 7/1991 | European Pat. Off. | H04N 3/32 |
|---|---|---|---|
| 0469567A3 | 7/1991 | European Pat. Off. | H04N 3/32 |

OTHER PUBLICATIONS

Copy EPO search report dated Sep. 14 1995, 3 pages.
Best of The Expander vol. 2, pp. 74–79,. Mitsubishi America 1988, Scan Velocity Modulation–Making it Crisp Around the Edges.
Copy Schematic DWG. Toshiba TV Receiver Model CF3254J, Scan Modulator U701, Circa 1993.
Copy Schematic DWG. Toshiba TV Receiver Model 30 ID1, SVM Drive Amplifier PW 6906–2, Pub. Gijutsu Oct. 1988 p. 301.
Copy Schematic DWG. National TV Receiver Model TH29X1, SVM Drive Amplifier TNP10121FZ, Pub. Dempa Shimbun 1990 p. 387.

*Primary Examiner*—Gregory C. Issing
*Attorney, Agent, or Firm*—Joseph S. Tripoli; Joseph J. Laks; Francis A. Davenport

[57] ABSTRACT

Scanning beam velocity modulation or SVM may be employed to produce subjective enhancement of picture sharpness. However, impulsive SVM deflection current may produce unwanted crosstalk into other circuitry thus a circuit configuration is disclosed where SVM currents are confined. An apparatus for electron beam deflection comprises a cathode ray tube having a scanning electron beam. A coil for supplementary electron beam deflection is mounted on the cathode ray tube. An amplifier is coupled between a supply of power and a return circuit and has an input coupled to a signal representing a video signal edge transition. The amplifier has an output which is coupled to the coil for generating a pulse current therein for electron beam deflection responsive to the signal. The amplifier and the coil are configured for circulation of the pulse current mainly within the coil and amplifier output without substantial pulse current flowing in the power supply and return circuit.

17 Claims, 4 Drawing Sheets

5,569,985

AMPLIFIER FOR SCANNING BEAM VELOCITY MODULATION

This invention relates generally to scanning beam velocity modulation (SVM), and more particularly to an amplifying circuit employed therein.

BACKGROUND OF THE INVENTION

It is known that apparent picture sharpness may be enhanced by modulation of the scanning beam velocity in accordance with a derivative of a video display signal. The derivative signal, or SVM signal, may be derived from a luminance component of the video display signal and is employed to produce scanning beam velocity variations. Slowing of the electron beam velocity results in brightening of the display, acceleration of the velocity results in display darkening. Thus, horizontal rate edges may be visually enhanced by a variation of the display intensity about an edge transition. This method of sharpness enhancement provides various advantages over that provided by video frequency peaking, for example, blooming of peaked high luminance picture elements is avoided, and additionally, video noise occurring within the bandwidth of a video peaker is not enhanced.

Scanning beam velocity may be modulated by an SVM coil which generates a supplementary deflection field. The SVM field, in conjunction with the main deflection field, produces electron beam acceleration or deceleration responsive to the polarity of current in the SVM coil. The amount of beam acceleration or deceleration is proportional to the magnitude of the SVM current. The deflection sensitivity of a typical SVM coil, may for example, be in the range where 1 ampere produces between 1 to 3 millimeters of beam deflection at center screen.

Since the SVM signal generally represents high frequency video content, it can be appreciated that the SVM coil current has a magnitude and frequency spectrum which is readily coupled to produce unwanted, extraneous crosstalk components. Such crosstalk components may result from coupling via the power supply and or return circuit. Hence it is advantageous to arrange that SVM coil current be generated and circulate without significant ground or power supply conduction.

SUMMARY OF THE INVENTION

An apparatus for electron beam deflection comprises a cathode ray tube having a scanning electron beam. A coil for supplementary electron beam deflection is mounted on the cathode ray tube. An amplifier is coupled between a supply of power and a return circuit and has an input coupled to a signal representing a video signal edge transition. The amplifier has an output which is coupled to the coil for generating a pulse current therein for electron beam deflection responsive to the signal. The amplifier and the coil are configured for circulation of the pulse current mainly within the coil and amplifier output without substantial pulse current flowing in the power supply and return circuit.

DETAILED DESCRIPTION

Figure 1:
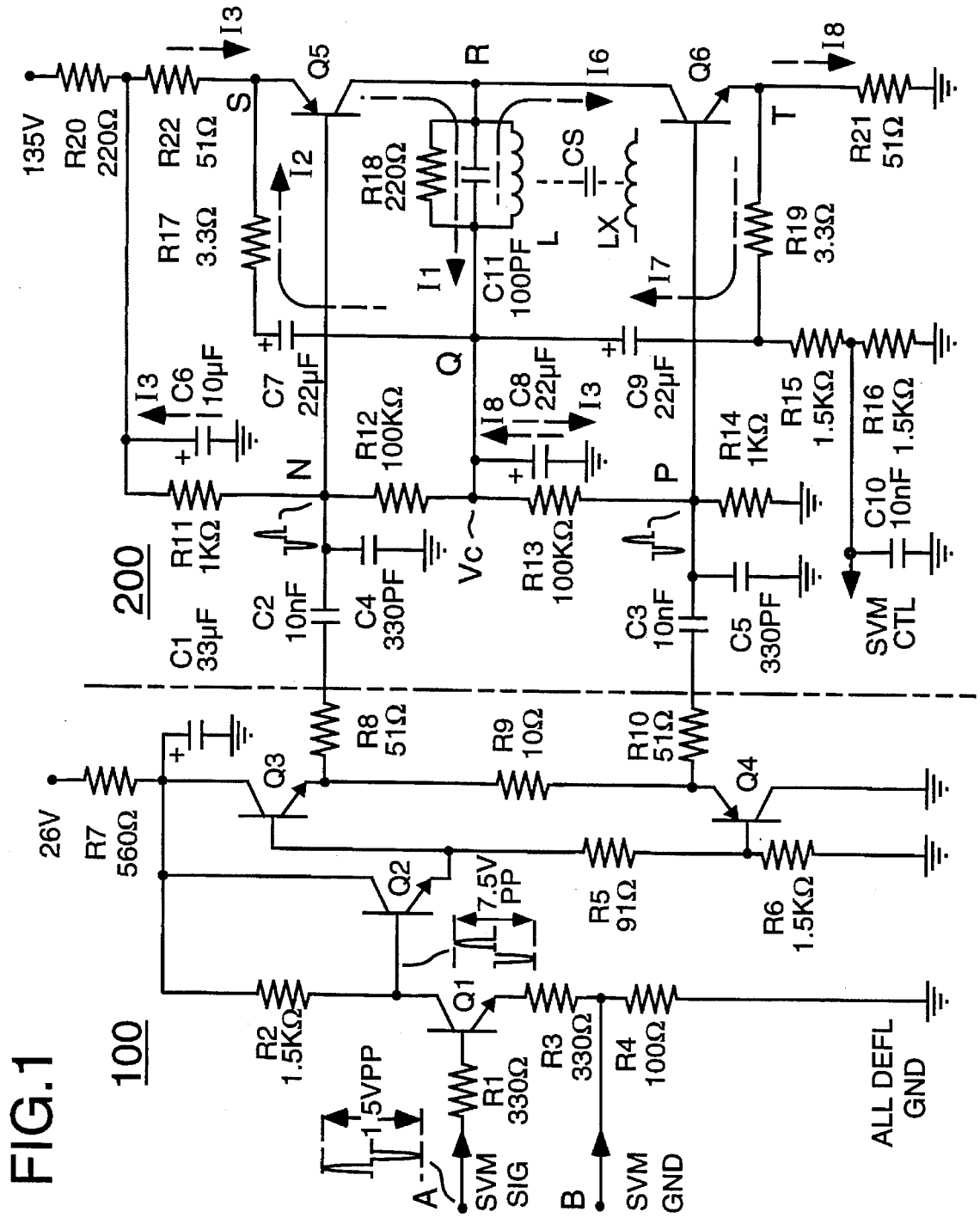
FIG. 1 illustrates an inventive scanning beam velocity modulation drive amplifier and auxiliary deflection coil.
Figure 2:
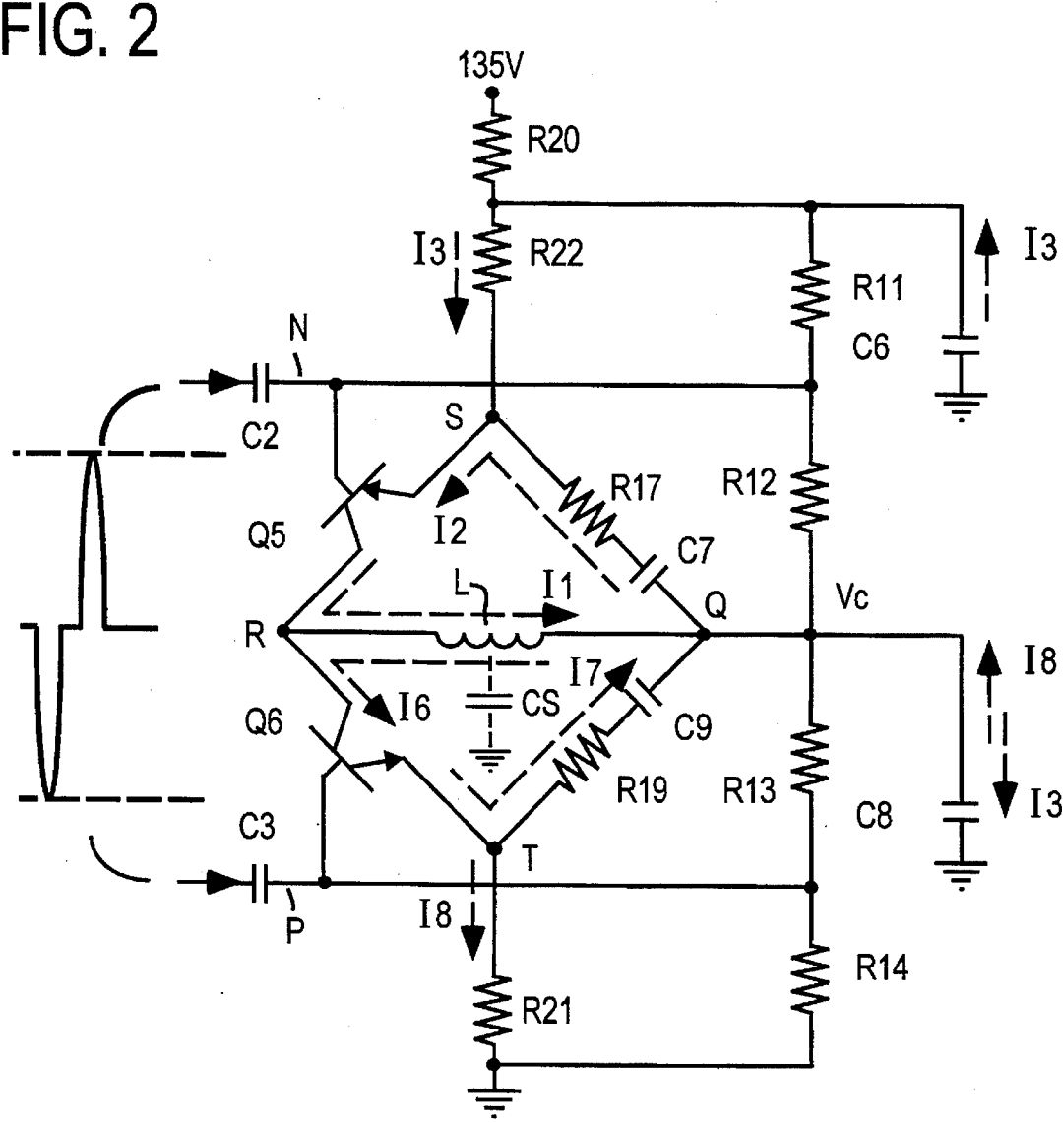
FIG. 2 illustrates the SVM coil driver of FIG. 1 depicted in a symmetrical bridge configuration.

In FIG. 1 a scanning beam velocity modulation signal or SVM signal, is input between terminals A and B. The SVM signal at terminal A is depicted for illustrative purposes as an impulse like waveform, having symmetrical peak to peak value of 1.5 volts. The derivation and processing of the SVM signal form no part of this application. The low side, or signal ground conductor from the SVM signal generator is coupled to the drive amplifier signal ground via a resistor to prevent unwanted coupling of transient interference or noise etc. The signal ground conductors shown in FIGS. 1 and 2 are all connected to a deflection ground conductor.

The inventive drive amplifier of FIG. 1 may be considered to comprise an amplifier and coring section 100, with a voltage gain of approximately 5 and an auxiliary deflection coil drive amplifier 200, configured essentially symmetrically about a voltage Vc, established mid way between the power supply and the driver ground. The AC coupled input signals at N and P are also symmetrically biased about voltage Vc for coupling to the complementary drive transistors. The auxiliary deflection or SVM coil is coupled between voltage Vc at point Q, and the junction of the drive transistor collectors, point R. The driver transistors are biased in class B such that negative transitions of the SVM signal cause conduction in the PNP transistor and positive signal transitions turn on the NPN transistor. Thus bidirectional deflection current is driven through the SVM coil from the collectors to circuit point Q, with an insignificantly small current component circulating outside the respective collector to emitter circuits. To provide control of power dissipation, particularly in the driver stage, feed back is provided from an emitter current sample. This attenuated and filtered signal SVM CTL is coupled to an SVM signal processing circuit which forms no part of this application.

The nominally 1.5 volt peak to peak SVM signal is input at terminal A with the SVM processor signal ground coupled to terminal B to reduce spurious and unwanted transient ground current crosstalk or noise. The signal at terminal A is coupled via a resistor R1 to the base of an NPN transistor Q1, which is configured as a common emitter amplifier with a gain of approximately 5. The emitter of transistor Q1 is connected to a series combination of resistor R3 and resistor R4 which are connected to ground, with the junction, terminal B, connected to the SVM processor ground. The collector of transistor Q1 is connected via a resistor R2 to a power supply, for example, 26 volts which is decoupled by series resistor R7 and decoupling capacitor C1. The collector of transistor Q1 is also coupled to the base terminal of an NPN transistor Q2, configured as an emitter follower amplifier. The collector of transistor Q2 is connected to the decoupled 26 volt power supply and the emitter is connected directly to a base terminal of an NPN transistor Q3. The emitter of transistor Q2 is also connected to a resistor R5 and a resistor R6, connected in series with resistor R6 connected to ground. The junction of the resistors is connected to the base terminal of an PNP transistor Q4. Transistors Q3 and Q4 are configured as emitter follower amplifiers where the SVM signal at the base of transistor Q4 has a DC offset with respect to the base of transistor Q3, as a result of current flow in resistor R5. This DC offset introduces coring or small signal amplitude attenuation of the SVM signal. The emitter of transistor Q3 is coupled via a resistor R8 to an AC coupling capacitor C2, and similarly the emitter of transistor Q4 is coupled via a resistor R10 to an AC coupling capacitor C3. The emitters of transistors Q3 and Q4 are connected together via a resistor R9 which provides control of RFI generation. The SVM signal at capacitor C2 is filtered for RFI reduction by a capacitor C4, connected to ground. The signal at capacitor C3 is RFI filtered by a capacitor C5 connected to ground. The base terminal of PNP driver transistor Q5 is connected to the junction of capacitors C2 and C4 and the junction of resistors R11 and R12. Similarly for the base terminal of NPN driver transistor Q6 which is connected to the junction of capacitors C3, C5 and resistors R13 and R14.

Resistors R11, R12, R13 and R14 form a series connected potential divider coupled between a supply voltage +V and ground. The supply voltage +V, for example approximately 135 volts is decoupled by a series resistor R20 and a bypass capacitor C6, which is connected to ground. Since the potential divider formed by resistors R11, R12, R13 and R14 is symmetrical, the center point Q at the junction of resistors R12 and R13, generates a voltage Vc having a value of half that of voltage +V, for example approximately 67 volts, which is decoupled to ground by capacitor C8. The emitter of PNP transistor Q5 is also coupled to center point Q, via a series connected capacitor C7 and resistor R17. Similarly the emitter of NPN transistor Q6 is coupled to the junction of resistors R12 and R13 via a series connected capacitor C9 and resistor R19. These two series coupled feedback paths effectively reduce the AC impedance at center point Q. The emitter of PNP transistor Q5 is connected to the 135 volt power supply via series connected resistors R22 and R20. Resistor R20 provides decoupling from the power supply as described. Resistor R22 at the emitter of transistor Q5 provides DC degeneration to control the DC operating point. Similarly the emitter of NPN transistor Q6 is connected to ground via resistor R21 for control of the DC operating point.

Figure 3A:
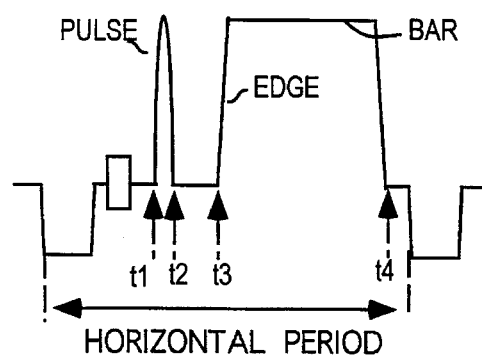
FIG. 3 illustrates an SVM coil and CRT together with an SVM signal and currents generated thereby.
Figure 3B:
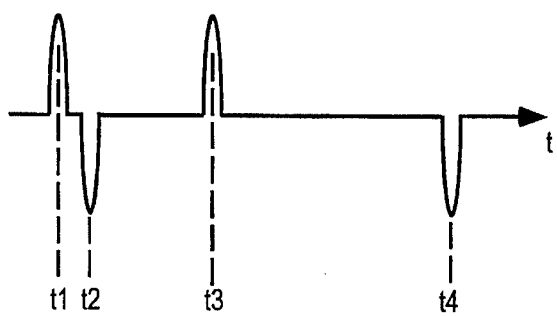
Figure 3C:
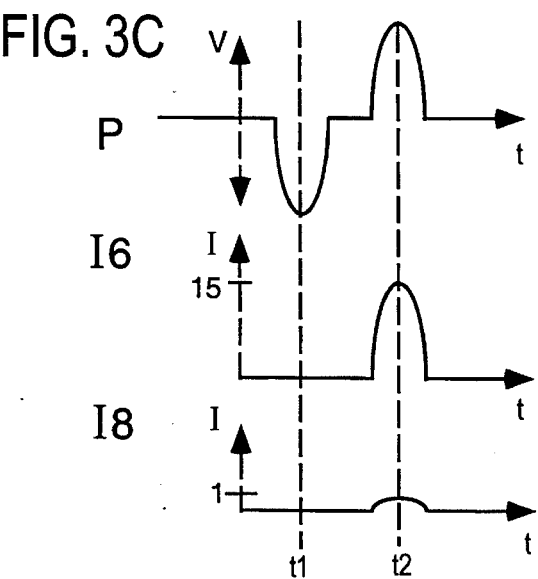
Figure 3D:
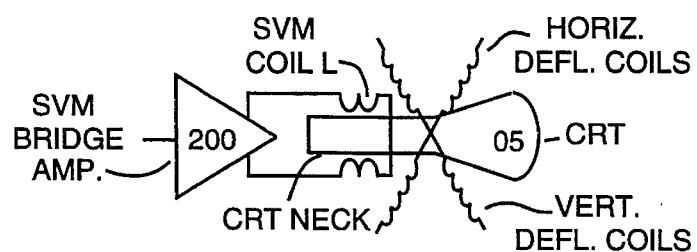

The SVM coil L is positioned on the CRT 05 tube neck shown in FIG. 3D and may be in close proximity to a signal ground or a low impedance conductor, for example a main deflection yoke LX. Such close proximity conductors provide stray coupling capacitance, depicted by capacitor CS, which not only impairs SVM performance by degrading the rise time of the of the coil current but additionally may provide an interference or crosstalk coupling path for the high frequency, impulsive SVM coil current. The nature of the SVM current is conducive to radiation and capacitive coupling into adjacent conductors. Furthermore it is very desirable that the impulsive SVM current be excluded from the power supply and return current paths such as ground conductors. Unwanted SVM interference may be injected into circuitry where the signal components are advanced or earlier than the video signal from which the SVM drive signal is generated. Thus the unwanted crosstalk signal or glitch is not hidden but is visible, anticipating the sharpness enhancing action of the SVM circuitry. Accordingly, as SVM operational frequencies are raised and drive currents are increased, it is increasingly important that the impulsive SVM drive currents be confined to the drive amplifier and auxiliary deflection or SVM coil.

FIG. 2 shows the inventive SVM amplifier of FIG. 1 redrawn to illustrate circuit 200 topologically as a symmetrical bridge. The bridge is illustrated with nodes S and T, and R and Q, corresponding to the same nodes shown in FIG. 1, where nodes S and T are coupled between the 135 volt supply and ground respectively. The emitter of transistor Q5, node S, is coupled to the power supply via resistors R22 and R20 and is decoupled to ground by capacitor C6. Node T, at transistor Q6 emitter is coupled to ground via resistor R21. The collectors of transistors Q5 and Q6 are joined and form drive node R of the bridge, with the auxiliary deflection or SVM coil connected across the center of the bridge to node Q. The tuning and damping components connected in parallel with SVM coil L, have been omitted for clarity. Node Q is decoupled to ground by a capacitor C8 and is DC biased to approximately half the supply voltage, for example 67 volts, by the resistive divider formed by series resistors R11, R12, R13 and R14. In the emitter circuitry of transistor Q5 are series connected capacitor C7 and resistor R17 which are connected to node Q. An identical series connected network formed by resistor R19 and capacitor C9 is connected from transistor Q6 emitter to node Q. Thus transistors Q5 and Q6 form one side of the bridge with the series connected capacitor and resistor networks forming the other side.

Typically in bridge configured circuitry, current may flow between opposite nodes, for example R and Q, without significant interaction with currents flowing between the other opposing nodes, for example S and T. Thus, SVM coil current flow between nodes R and T is confined to circulate largely within the bridge circuit and is largely absent from the power supply and ground. Hence high frequency impulsive SVM currents are prevented from potentially interfering conduction via the power supply or return.

The processed and amplified SVM signals are AC coupled to the bridge configured driver transistors Q5 and Q6 via capacitors C2 and C3 respectively. Transistors Q5 and Q6 operate as class B amplifiers with the bases biased at cut off by the resistive divider R11, R12, R13 and R14. Transistors Q5 and Q6 may be biased further off by suitable manipulation of the resistor values if additional signal coring is required. A negative SVM signal impulse at point N causes transistor Q5 to conduct and cause an impulsive current I1 to circulate via the SVM coil to node Q, and capacitors C7, C8, C9 and CS. Current I1 comprises essentially two parts, where I1=I2+I3, where I2 circulates within the bridge and current I3 is conducted through the coil via capacitors CS and C8 and returning via capacitor C6 and resistor R22. When transistor Q5 turns on, a low impedance circuit is formed causing current sourced by C7 to circulate through SVM coil L and series connected resistor R17. Since the value of resistor R17, 3.3 ohms is small compared with the value of resistor R22, 51 ohms, current I2 is large compared to current I3. For example, with the values indicated in FIG. 1, I3 is approximately 1/15 that of current I2. The duration of transistor Q5 conduction is determined by the width of the SVM impulse, which for example may be 150 nanoseconds. Thus when transistor Q5 is conducting a discharge path is formed having a discharge time constant, due to resistor R17 and capacitor C7, of approximately 75 microseconds, ignoring the saturation resistance of transistor Q5. Hence, since capacitor C7 sources SVM current for only about 150 nanoseconds the voltage across the capacitor is not significantly changed or discharged. Capacitor C8 also sources a 150 nanoseconds current pulse via the SVM coil, transistor Q5, resistor R22 and capacitor C6, which appears in series as current I3. Stray capacitor CS is also discharged via a current path through ground and capacitors C6 and C8. However, since the value of stray capacitance is minuscule in comparison to capacitors C6, C7, C8 and C9, being in the order of 25 picofarad, the stray conducted SVM current is also minuscule in comparison to the current circulating within the bridge. Typically current I1 has a peak value in the order of 600 milliamperes, with I3 being typically 40 milliamperes.

A positive SVM signal impulse at point P causes transistor Q6 to conduct an impulse current I6 from node Q, via SVM coil L, being sourced essentially by capacitor C9. The current conducted by transistor Q6 to SVM coil L comprises essentially two components I6=I7+I8, where I7 circulates within the bridge and current I8 is conducted through the coil via capacitors CS and resistor R21 and returns via capacitor C8. Since the value of resistor R19, 3.3 ohms, is small compared with the value of resistor R22, 51 ohms, current I7 is large compared to current I8, thus I8 has a value approximately 1/15 that of I7 The inventive bridge configuration illustrated in FIG. 2 advantageous ensures that the SVM current circulating within the bridge is at least an order of magnitude greater than the SVM current conducted beyond the bridge via ground planes and power supply conductors. SVM Current conducted via stray capacitance CS circulates through ground and C8. Any reduction in stray capacitance CS directly reduces the magnitude of ground conducted currents I3 and I8. The discharge time constant formed by resistor R19 and capacitor C9 functions as described for transistor QS. Since transistor Q6 conducts for approximately 150 nanoseconds, which corresponds to approximately 1/500 of discharge time constant, there is no appreciable change in the voltage across capacitor C9.

FIG. 3A depicts a "pulse and bar" video signal occurring during the horizontal period of one TV line. FIG. 3B illustrates an SVM signal at terminal A of FIG. 1, comprised essentially of edges, or horizontal transitions, derived from the signal shown in FIG. 3A but depicted with an expanded time scale. FIG. 3C depicts voltage and current pulses occurring at times t1 and t2 but with an expanded time scale. Waveform P depicts the SVM voltage waveform occuring at point P, which is coupled to cause SVM current conduction in transistor Q6. The signal waveform depicted in P is identical to the signal applied at circuit point N in FIG. 1, and results in SVM current conduction for negative signal values. Waveform I6 shows the collector current of transistor Q6 circulating within the bridge components, SVM coil L, resistor R19 and capacitor C9. Waveform I8 shows the current out of the bridge circuit during transistor Q6 conduction which is approximately 1/15 that of collector current I6.

Figure 4:
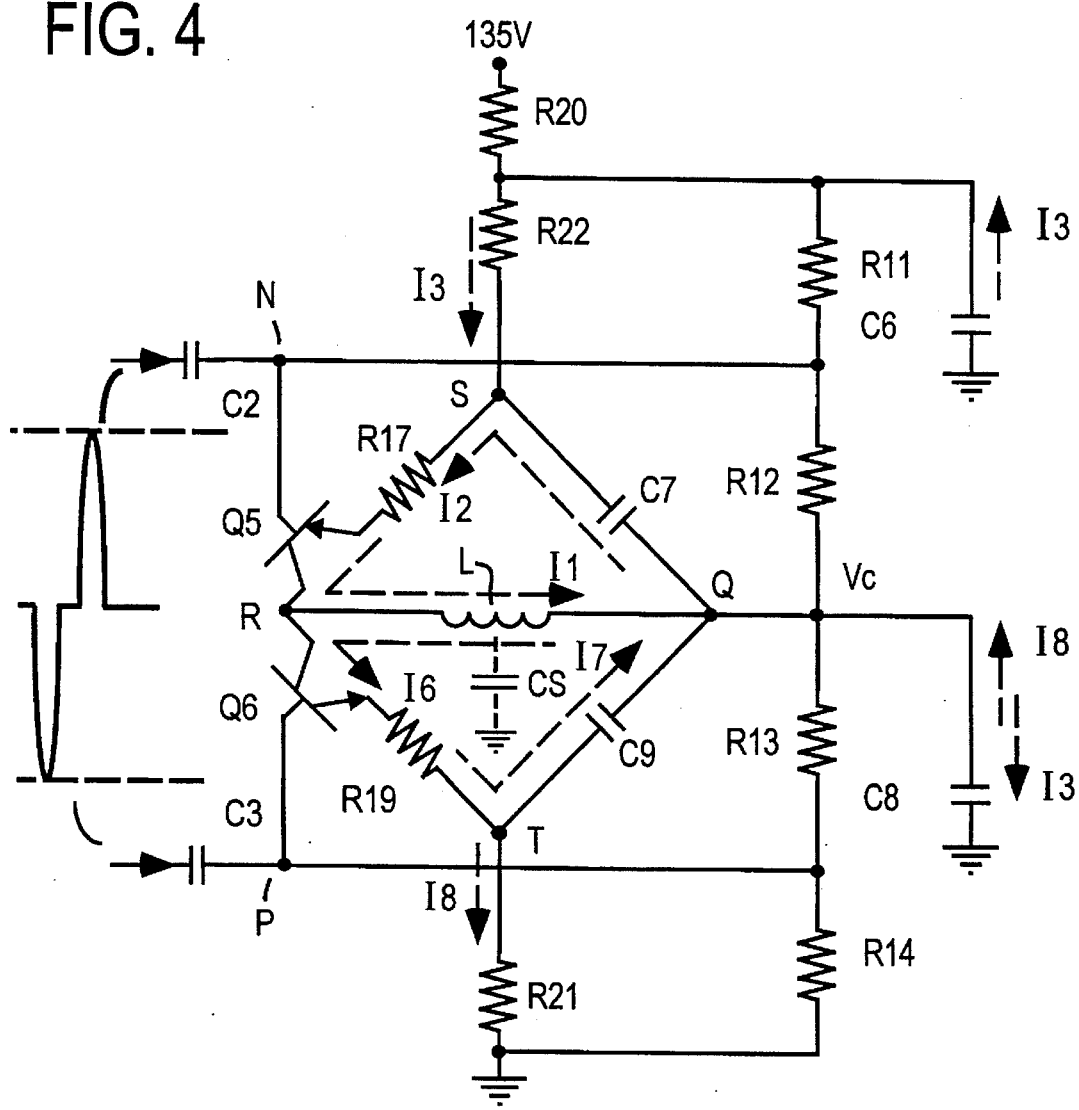
FIG. 4 illustrates an inventive modification to the circuit of FIG. 1, depicted as a bridge configuration.

FIG. 4 shows an inventive modification to the bridge configured SVM amplifier of FIG. 2. In FIG. 4, nodes S and T are relocated to the junctions of the series feedback networks comprising resistor R17 and capacitor C7 and resistor R19 and capacitor C9 respectively. The circuit operation remains largely as described for FIG. 2. However, in the embodiment shown in FIG. 4, conduction in either transistor Q5 or Q6, responsive to the appropriate polarity of input signal, causes impulsive currents to be sourced by capacitor C7 or C9. FIG. 4 differs from FIGS. 1 and 2 in that resistors R17 and R19 are relocated to become emitter resistors for transistors Q5 and Q6 respectively. Thus when either transistor Q5 or Q6 is turned on responsive to an SVM pulse, a low impedance path is formed resulting in current flow from either capacitor C7 or C9 through the SVM coil and resistors R17 or R19. The emitters of transistors Q5 or Q6 are coupled via resistors R17 or R19 to a junction of a voltage divider or feedback network formed by resistor R22, and C7 or R21, and C9. If a continuous train of alternate polarity SVM pulses of 150 nanoseconds width are considered, and Fourier components beyond the fundamental are ignored, capacitors C7 or C9 will represent an impedance of approximately 2 milli ohms. Thus the emitter current, or SVM coil current is divided at the junction of the voltage divider, approximately in the ratio of the impedances for example, 51/0.002, or 25,500:1. Thus with exemplary SVM coil currents I1, I6, of 600 milli amperes, the respective currents conducted beyond the bridge circuit, I3, I8, will have an approximate value of 24 micro amperes. Hence in the bridge configuration of FIG. 4, essentially all the SVM coil current I1, I6 circulates within the inventive bridge configured output stage. The SVM currents I3, I8, conducted beyond the bridge, via the power supply or return conductors, are insignificant and sufficiently small to render unwanted coupling effects imperceptible. The bridge configuration ensures that the SVM current circulating within the bridge is at least an order of magnitude greater than the SVM current conducted beyond the bridge via ground planes and power supply conductors. Impulsive currents I1 and I2 are essential equal and impulse current I3 is substantially reduced and essentially comprises current due to stray capacity CS. The impulse current sourced by capacitor C7 is recharged via resistor R22 when transistor Q5 is non-conducting. Similarly for transistor Q6, where a positive input impulse causes transistor Q6 to conduct current from capacitor C9 via resistor R19 and the SVM coil. Discharge currents I6 and I7 are essentially equal, and current I8 is essentially due to stray capacity CS. Capacitor C9 is recharged during periods of non-conduction of transistor Q6 via resistor R21. Thus the embodiment of FIG. 4 generates impulse or SVM currents which circulate within the bridge and are essentially absent from the power supply and return.

The inventive bridge configured SVM coil drive amplifier confines impulsive current to circulate largely within the bridge circuit, hence high frequency SVM currents are largely prevented from potentially interfering conduction via the power supply or power return.

What is claimed is:

1. An apparatus for electron beam deflection, comprising:

a cathode ray tube having a scanning electron beam;

a coil for supplementary electron beam deflection mounted on said cathode ray tube:

a signal representing a video signal edge transition;

an amplifier coupled between a supply of power and a return circuit and having an input coupled to said signal and an output coupled to said coil for generating a pulse current therein for electron beam deflection responsive to said signal; and, said amplifier and said coil being configured for circulation of said pulse current within said coil and said amplifier, and a component of said pulse current circulating within said coil, said amplifier, said power supply and said return circuit, said component having a smaller magnitude than said pulse current which renders unwanted coupling effects in said power supply and said return circuit insignificant.

2. The apparatus claim 1, wherein said amplifier and said coil have a symmetrical configuration.

3. The apparatus claim 2, wherein said symmetrical configuration is a bridge.

4. The apparatus claim 3, wherein said bridge comprises a potential divider for determining said smaller magnitude of said pulse current component.

5. An amplifier for beam scan velocity modulation (SVM) signals, comprising:

a power supply for energizing said amplifier;

a power return for said amplifier;

a bridge configuration, having first, second, third and fourth nodes;

a first means generating a first SVM signal current, bridging said first and second nodes;

second means generating a second SVM signal current, bridging said second and third nodes;

a SVM coil bridging said second and fourth nodes;

a first feedback path bridging said first and fourth nodes; and;

a second feedback path bridging said third and fourth nodes;

said first and second feedback paths dividing said first and second SVM currents to circulate within said bridge and have insignificant propagation to said power supply and said power return.

6. The amplifier of claim 5, wherein said first means comprises an amplifier configured as a complementary emitter follower.

7. The amplifier of claim 5, wherein said first means comprises a coring amplifier.

8. The amplifier of claim 5, wherein said bridge configuration comprises complementary transistors having common collector terminals and substantially equal emitter terminal feedback paths.

9. The amplifier of claim 5, wherein said first feedback and said second feed back paths comprises a resistive-capacitive feedback path.

10. The amplifier of claim 5, wherein said first feedback and said second feed back paths comprise a capacitive feedback paths.

11. An amplifier for beam scan velocity modulation (SVM) signals, comprising:

a power supply for energizing said amplifier;

a power return for said amplifier;

means coupled to an SVM input signal for amplification and coring thereof;

a drive amplifier having a bridge configuration, receiving an amplified and cored signal from said means, and generating a current responsive thereto;

an SVM coil coupled to said bridge for beam scan velocity modulation responsive to said current, said current being divided into a significant current confined to circulate within said bridge and said coil, and an insignificant current at least one order of magnitude less than said significant current conducted by said power supply and said power return.

12. The amplifier of claim 11, wherein said means comprises a transistor amplifier coupled to a complementary transistor pair configured as an emitter follower amplifier and biased to provide coring.

13. The amplifier of claim 11, wherein said drive amplifier comprises a complementary transistor pair configured as a common emitter amplifier having common collector terminals and biased such that a positive excursion of said amplified and cored signal generates said current having a first conduction direction in a one of said pair and a negative excursion of said amplified and cored signal generates said current having a second conduction direction in said other one of said pair.

14. The amplifier of claim 13, wherein said complementary transistor pair being biased such that said amplified and cored signal is additionally cored.

15. The amplifier of claim 13, wherein said SVM coil is coupled between said common collector terminals and a zero signal reference potential.

16. The amplifier of claim 13, wherein a zero signal reference potential corresponds to approximately half the power supply potential.

17. The amplifier of claim 11, wherein said insignificant current is sufficiently small to render unwanted coupling effects imperceptible.

* * * * *

UNITED STATES PATENT AND TRADEMARK OFFICE
CERTIFICATE OF CORRECTION

PATENT NO. : 5,569,985

DATED : October 29, 1996

INVENTOR(S) : Dal F. Griepentrog

It is certified that error appears in the above-identified patent and that said Letters Patent is hereby corrected as shown below:

On the title page:
   Item [56] "References Cited" "U.S. PATENT DOCUMENTS" insert:
     --4,641,195   2/1987   Inoue et al............348/626
     --4,665,432   5/87     Shima.................348/625
     --5,072,300   12/91    Anderson..............348/626
     --5,196,941   3/93     Altmanshofer..........348/626
     --5,223,769   6/93     Priere et al..........315/370--

Item [56] "References Cited" "FOREIGN PATENT DOCUMENTS" insert:
     --4428491     2/95     Germany...............H04N 9/16--
     --2064911     6/81     United Kingdom........H04N 3/32--

Item [56] "References Cited" "OTHER PUBLICATIONS" insert:
   --Patent Abstracts of Japan, E1020, Pgs. 102, JP 2-260766A,
     (Matsushita Electric Industrial Co. Ltd.) 23 October 1990--.

Signed and Sealed this

Tenth Day of March, 1998

*Attest:*

BRUCE LEHMAN

*Attesting Officer*        *Commissioner of Patents and Trademarks*